(12) United States Patent
Tanaka et al.

(10) Patent No.: US 10,179,311 B2
(45) Date of Patent: Jan. 15, 2019

(54) INTERMITTENT-BUBBLING EQUIPMENT

(71) Applicant: SUMITOMO ELECTRIC INDUSTRIES, LTD., Osaka-shi, Osaka (JP)

(72) Inventors: Hiromu Tanaka, Osaka (JP); Toru Morita, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 253 days.

(21) Appl. No.: 15/119,744

(22) PCT Filed: Mar. 12, 2015

(86) PCT No.: PCT/JP2015/057338
§ 371 (c)(1),
(2) Date: Aug. 18, 2016

(87) PCT Pub. No.: WO2015/146611
PCT Pub. Date: Oct. 1, 2015

(65) Prior Publication Data
US 2017/0056831 A1    Mar. 2, 2017

(30) Foreign Application Priority Data
Mar. 25, 2014 (JP) .................. 2014-062810

(51) Int. Cl.
*B01F 3/04* (2006.01)
*B01D 65/02* (2006.01)
*B01D 61/20* (2006.01)

(52) U.S. Cl.
CPC ............. *B01D 65/02* (2013.01); *B01D 61/20* (2013.01); *B01F 3/04113* (2013.01);
(Continued)

(58) Field of Classification Search
CPC .... B01D 61/20; B01D 65/02; B01D 2313/26; B01D 2315/06; B01D 2315/20;
(Continued)

(56) References Cited

U.S. PATENT DOCUMENTS 3,246,761 A * 4/1966 Bryan et al. ............ C02F 3/223
126/344
3,592,450 A * 7/1971 Rippon ................. B01F 3/0451
15/104.31
(Continued)

FOREIGN PATENT DOCUMENTS

| CN | 1030738 A | 2/1989 |
| JP | S-63-398 Y2 | 1/1988 |
| JP | S63-315195 A | 12/1988 |
| JP | H01-164495 A | 6/1989 |
| JP | 2003-340250 A | 12/2003 |
| JP | 4833353 B2 | 12/2011 |

*Primary Examiner* — Charles S Bushey
(74) *Attorney, Agent, or Firm* — Drinker Biddle & Reath LLP

(57) ABSTRACT

The present invention provides intermittent-bubbling equipment used while being immersed in a liquid. The intermittent-bubbling equipment includes a tubular casing vertically disposed; and a plurality of partition walls disposed substantially parallel to an axial direction in the casing, and configured to define a gas introducing chamber, a gas inducing chamber, and a gas discharging chamber. The gas introducing chamber and the gas inducing chamber communicate with each other at a top of the casing, and the gas inducing chamber and the gas discharging chamber communicate with each other at a bottom of the casing. An upper side of the gas introducing chamber and an upper side of the gas inducing chamber are closed by a lid plate, and a lower side of the gas inducing chamber and a lower side of the gas discharging chamber are closed by a bottom plate. A cross-sectional area of the gag introducing chamber may be greater than a cross-sectional area of the gas discharging chamber. An upper edge of a connecting hole between the gas inducing chamber and the gas discharging chamber may (Continued)

be substantially horizontal. A bottom plate that closes the gas inducing chamber and a bottom plate that closes the gas discharging chamber may be formed by a single flat member.

6 Claims, 11 Drawing Sheets

(52) U.S. Cl.
CPC ...... *B01D 2313/26* (2013.01); *B01D 2315/06* (2013.01); *B01D 2321/18* (2013.01)

(58) Field of Classification Search
CPC .......... B01D 2321/18; B01D 2321/185; B01D 2321/2066; B01F 3/04113; B01F 2003/04134
USPC ................................................ 261/81, 121.1
See application file for complete search history.

(56) References Cited

U.S. PATENT DOCUMENTS

| | | | | |
|---|---|---|---|---|
| 4,169,873 | A | * | 10/1979 | Lipert .................. B01F 3/0451 210/221.1 |
| 4,752,421 | A | * | 6/1988 | Makino ................ B01F 3/0451 210/242.2 |
| 4,879,046 | A | | 11/1989 | Kojima |
| 8,079,572 | B2 | * | 12/2011 | Schaefer ............. B01D 63/024 261/121.1 |
| 9,815,027 | B2 | * | 11/2017 | Phelps .................. B01D 65/02 |
| 2011/0198283 | A1 | * | 8/2011 | Zha ...................... B01D 63/024 210/626 |
| 2014/0076806 | A1 | * | 3/2014 | Min ..................... B01F 15/024 210/636 |
| 2017/0120197 | A1 | * | 5/2017 | Tanaka .................. B01D 65/02 |

* cited by examiner

INTERMITTENT-BUBBLING EQUIPMENT

TECHNICAL FIELD

The present invention relates to intermittent-bubbling equipment.

BACKGROUND ART

As a technique for wastewater treatment, a method using a membrane module that separates impurities from water is known. In the method using such a membrane module, separation membranes of the membrane module need to be cleaned, because impurities are accumulated on the separation membranes. The separation membranes are cleaned, for example, using bubbles. Examples of the technique using bubbles include a membrane module system that uses a pulsed gas lift pump (see Japanese Patent No. 4833353).

The membrane module system disclosed in this document is immersed in a liquid during use. The membrane module system supplies, to a membrane module, bubbles generated by continuous supply of pressurized gas and a high speed gas-liquid two-phase flow of feed liquid, thereby scouring the surfaces of permeable hollow fiber membrane bundles in the membrane module. The high speed gas-liquid two-phase flow contains a high-speed moving liquid and many independent small-diameter bubbles therein.

CITATION LIST

Patent Literature

PTL 1: Japanese Patent No. 4833353

SUMMARY OF INVENTION

Technical Problem

The ability to scour the membrane module (permeable hollow fiber membrane bundles) with bubbles largely depends on the energy of bubbles, particularly on the kinetic energy of bubbles and the degree of contact with the hollow fiber membranes. Therefore, with the method of supplying small-diameter bubbles to the permeable hollow fiber membrane bundles, the permeable hollow fiber membrane bundles cannot be sufficiently scrubbed with the bubbles and effective cleaning cannot be achieved. For effective cleaning, it is required to provide equipment capable of generating large-diameter bubbles.

The present invention has been made in view of the circumstances described above. An object of the present invention is to provide intermittent-bubbling equipment that is capable of generating large-diameter (large-volume) bubbles and can be suitably used for cleaning a membrane module.

Solution to Problem

The present invention made to solve the problems described above provides intermittent-bubbling equipment that is used while being immersed in a liquid. The intermittent-bubbling equipment includes a tubular casing vertically disposed; and a plurality of partition walls disposed substantially parallel to an axial direction in the casing, and configured to define a gas introducing chamber, a gas inducing chamber, and a gas discharging chamber. The gas introducing chamber and the gas inducing chamber communicate with each other at a top of the casing, and the gas inducing chamber and the gas discharging chamber communicate with each other at a bottom of the casing. An upper side of the gas introducing chamber and an upper side of the gas inducing chamber are closed by a lid plate, and a lower side of the gas inducing chamber and a lower side of the gas discharging chamber are closed by a bottom plate.

Advantageous Effects of Invention

The intermittent-bubbling equipment according to the present invention is capable of generating large-diameter (large-volume) bubbles and can be suitably used for cleaning a membrane module.

DESCRIPTION OF EMBODIMENTS

Figure 1:
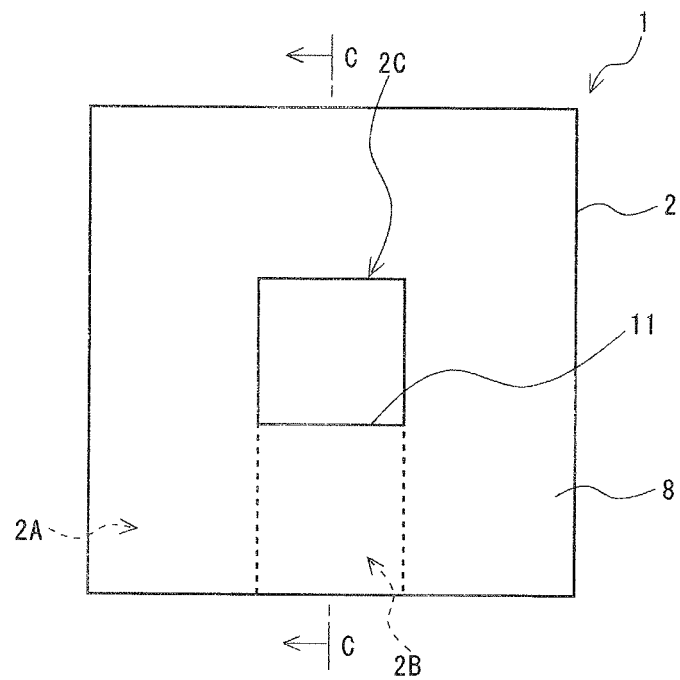
FIG. 1 is a schematic plan view of intermittent-bubbling equipment according to a first embodiment of the present invention.
Figure 2:
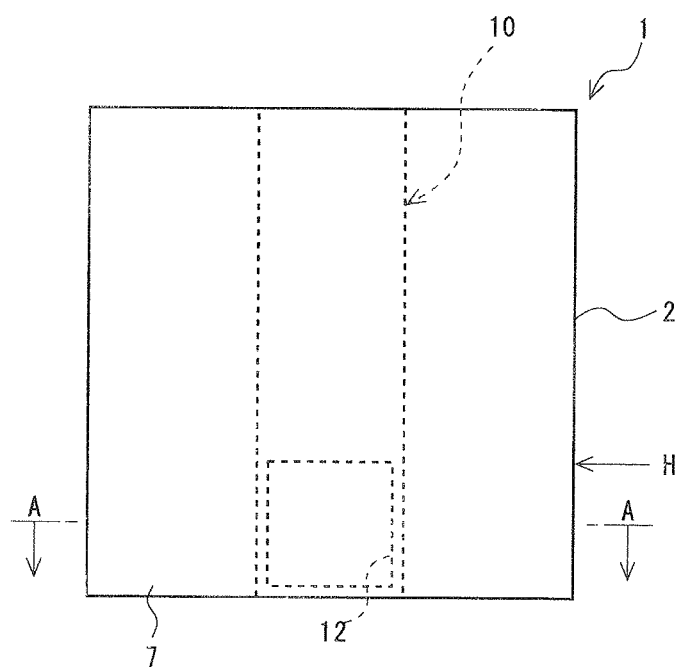
FIG. 2 is a schematic front view of the intermittent-bubbling equipment illustrated in FIG. 1.
Figure 3:
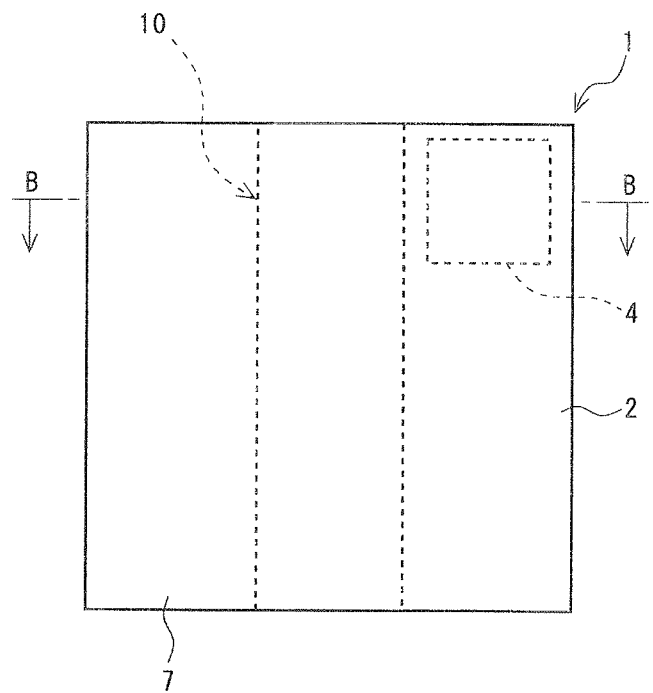
FIG. 3 is a schematic left side view of the intermittent-bubbling equipment illustrated in FIG. 1.

Description of Embodiments of the Present Invention

The present invention provides intermittent-bubbling equipment used while being immersed in a liquid. The intermittent-bubbling equipment includes a tubular casing vertically disposed; and a plurality of partition walls disposed substantially parallel to an axial direction in the casing, and configured to define a gas introducing chamber, a gas inducing chamber, and a gas discharging chamber. The gas introducing chamber and the gas inducing chamber communicate with each other at a top of the casing, and the gas inducing chamber and the gas discharging chamber communicate with each other at a bottom of the casing. An upper side of the gas introducing chamber and an upper side of the gas inducing chamber are closed by a lid plate, and a lower side of the gas inducing chamber and a lower side of the gas discharging chamber are closed by a bottom plate.

In the intermittent-bubbling equipment, gas is introduced from the lower side of the gas introducing chamber and stored in the casing (i.e., in the gas introducing chamber and the gas inducing chamber). Then, when gas is further introduced and the liquid levels in the gas introducing chamber and the gas inducing chamber reach a connecting hole between the gas inducing chamber and the gas discharging chamber, the gas in the gas inducing chamber is discharged as a relatively large bubble from the gas discharging chamber. The reason for which the relatively large bubble is discharged is not necessarily clear. A possible reason is that when gas in the gas inducing chamber is moved to the gas discharging chamber through the connecting hole between the gas inducing chamber and the gas discharging chamber, an attractive force acts on the following gas.

A cross-sectional area of the gas introducing chamber may be greater than a cross-sectional area of the gas discharging chamber. This allows gas stored in the casing to be effectively discharged at once, and makes it possible to more effectively generate a large bubble. The reason for this is not necessarily clear, but it is probably because of a difference in liquid pressure between the gas introducing chamber and the gas discharging chamber.

An upper edge of the connecting hole between the gas inducing chamber and the gas discharging chamber may be formed to be substantially horizontal. With the substantially horizontal upper edge of the connecting hole, a large amount of gas can be easily guided at once from the gas inducing chamber to the gas discharging chamber, and this facilitates generation of a large bubble.

A bottom plate that closes the gas inducing chamber and a bottom plate that closes the gas discharging chamber may be formed by a single flat member. With this configuration, the number of components can be reduced. Also, since the flat member forming the bottom plates is secured to both the partition walls defining the gas discharging chamber and the casing, the securing strength between the partition walls and the casing is improved, and hence the mechanical strength of the intermittent-bubbling equipment is improved.

The gas discharging chamber may be disposed in a center of the casing in plan view. With this configuration, the gas introducing chamber and the gas inducing chamber can be arranged around the gas discharging chamber in the center in plan view, and, for example, the gas introducing chamber can be disposed to surround the gas discharging chamber in plan view. Thus, when gas is introduced from below the casing, the gas does not easily escape to the outside and can be accurately introduced into the gas introducing chamber.

The casing may have four external walls arranged in the shape of a rectangular tube. The plurality of partition walls may include four internal walls configured to define the gas discharging chamber in the shape of a rectangular column, and two parallel division walls configured to define the gas introducing chamber and the gas inducing chamber. The internal walls may be disposed substantially parallel to the opposite external walls. The division walls may extend continuously from respective two opposite ones of the four internal walls to one of the external walls. The internal wall interposed between the two internal walls may have a connecting hole between the gas inducing chamber and the gas discharging chamber. With this configuration, the intermittent-bubbling equipment can be produced by assembling flat members serving as basic components, and hence the cost of manufacture can be reduced.

The intermittent-bubbling equipment may be used for cleaning a filtration module having a plurality of filtration membranes. When the intermittent-bubbling equipment is used for cleaning the filtration module, large-diameter bubbles can be supplied from the intermittent-bubbling equipment to the filtration module. With the large-diameter bubbles, which have large buoyancy, the filtration membranes of the filtration module can be efficiently scrubbed or swung. The intermittent-bubbling equipment can thus effectively clean the filtration module.

Note that the "substantially parallel" refers not only to being exactly parallel, but also to having an absolute angular difference within 10° (preferably within 5°), and the same applies to the other parts of the present description. Similarly, the term "substantially horizontal" refers not only to being exactly horizontal, but also to having an absolute angular difference within 10° (preferably within 5°) from the horizontal, and the same applies to the other parts of the present description.

Details of Embodiments of the Present Invention

Embodiments of the intermittent-bubbling equipment according to the present invention will now be described in detail with reference to the drawings.

First Embodiment

Figure 6:
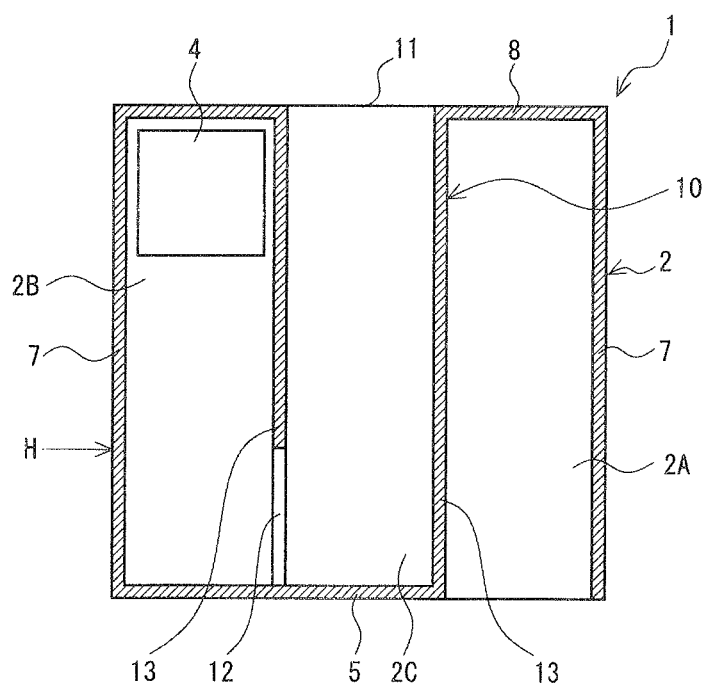
FIG. 6 is a cross-sectional view taken along line C-C of FIG. 1.
Figure 7:
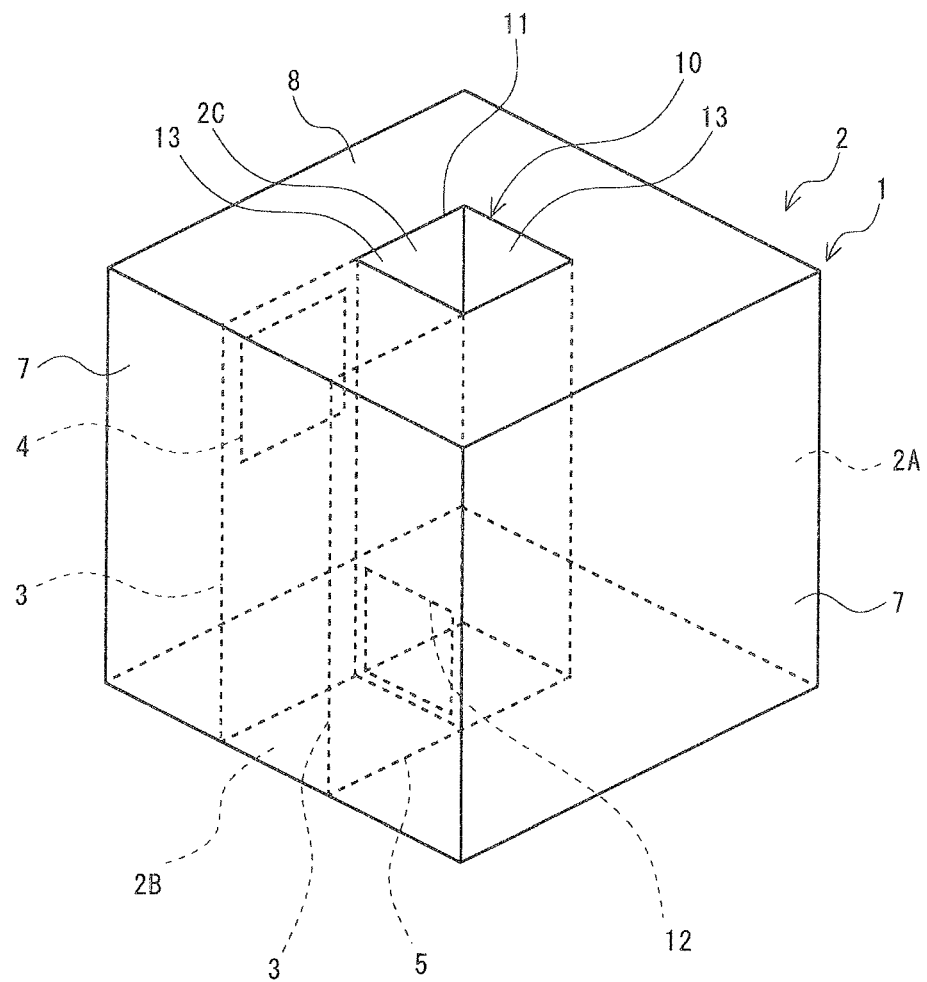
FIG. 7 is a schematic perspective view of the intermittent-bubbling equipment illustrated in FIG. 1.
Figure 8:
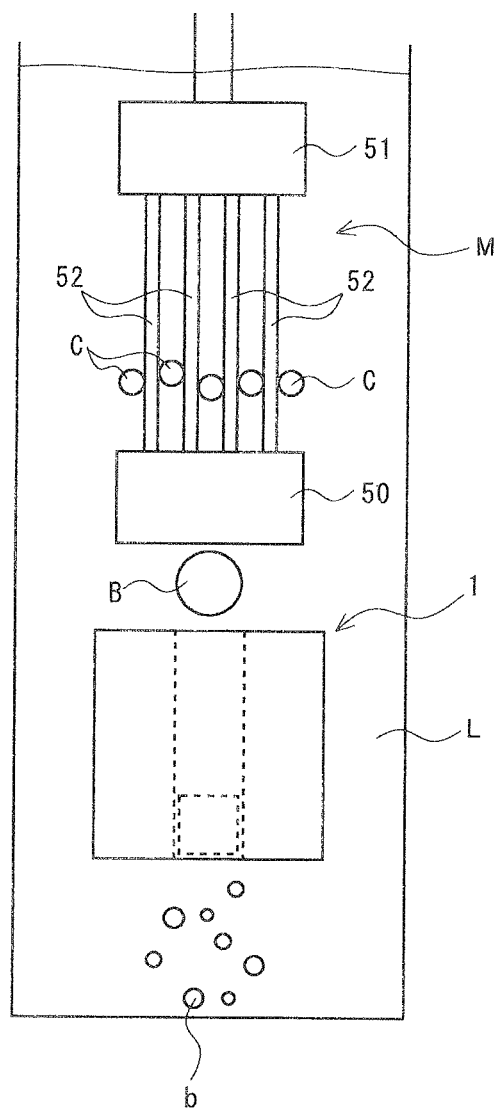
FIG. 8 is a schematic diagram for describing how the intermittent-bubbling equipment illustrated in FIG. 1 is used.

Intermittent-bubbling equipment 1 illustrated in FIGS. 1 to 11 is used while being immersed in a liquid L. For example, as illustrated in FIG. 8, the intermittent-bubbling equipment 1 is used to clean a filtration module M having filtration membranes 52. Specifically, the intermittent-bubbling equipment 1 immersed in the liquid L stores gas (bubbles b) supplied, for example, from a compressor through a gas supply pipe (not shown). Then, when the volume of the stored gas exceeds a given value, the intermittent-bubbling equipment 1 intermittently discharges the gas to supply relatively large bubbles B.

Figure 4:
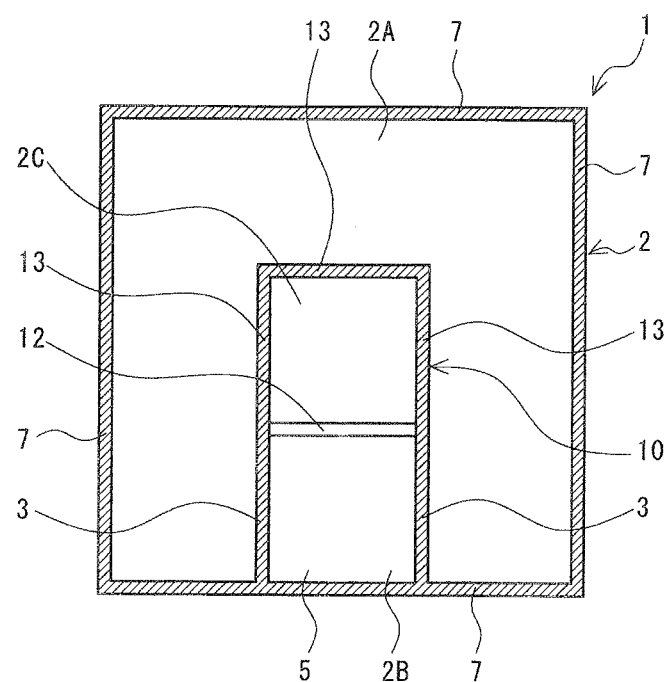
FIG. 4 is a cross-sectional view taken along line A-A of FIG. 2.
Figure 5:
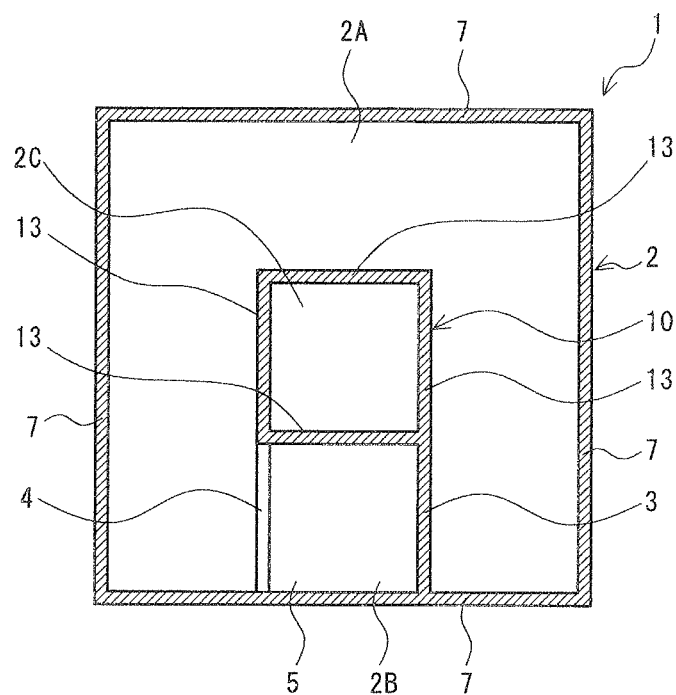
FIG. 5 is a cross-sectional view taken along line B-B of FIG. 3.

As illustrated in FIGS. 4 to 6, the intermittent-bubbling equipment 1 includes a tubular casing 2 vertically disposed, and a plurality of partition walls 3 and 13 disposed substantially parallel to the axial direction in the casing 2. As described below, the partition walls 3 and 13 divide the interior of the casing 2 into a gas introducing chamber 2A, a gas inducing chamber 2B, and a gas discharging chamber 2C.

The casing 2 has four external walls 7 arranged in the shape of a rectangular tube. The intermittent-bubbling equipment 1 includes four internal walls 13 serving as the partition walls described above. A discharge pipe 10 formed by the internal walls 13 contains the gas discharging chamber 2C having the shape of a rectangular column. The intermittent-bubbling equipment 1 thus has a double tubular structure formed by the external walls 7 and the internal walls 13.

The gas introducing chamber 2A and the gas inducing chamber 2B communicate with each other at the top of the casing 2, and the gas inducing chamber 2B and the gas discharging chamber 2C communicate with each other at the bottom of the casing 2. The upper side of the gas introducing chamber 2A and the upper side of the gas inducing chamber 2B are closed by a lid plate 8, and the lower side of the gas inducing chamber 2B and the lower side of the gas discharging chamber 2C are closed by a bottom plate 5.

Figure 9:
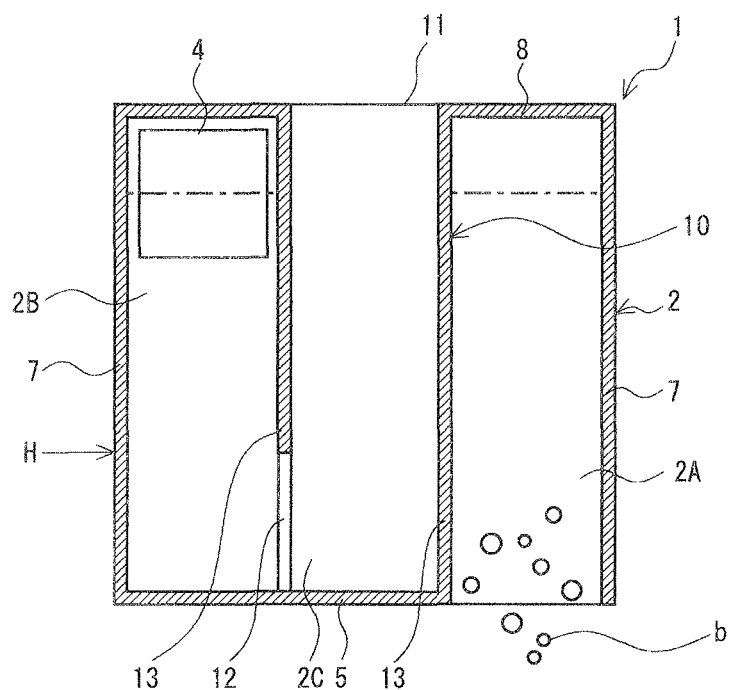
FIG. 9 is a schematic cross-sectional view for describing an operation of the intermittent-bubbling equipment illustrated in FIG. 1.
Figure 10:
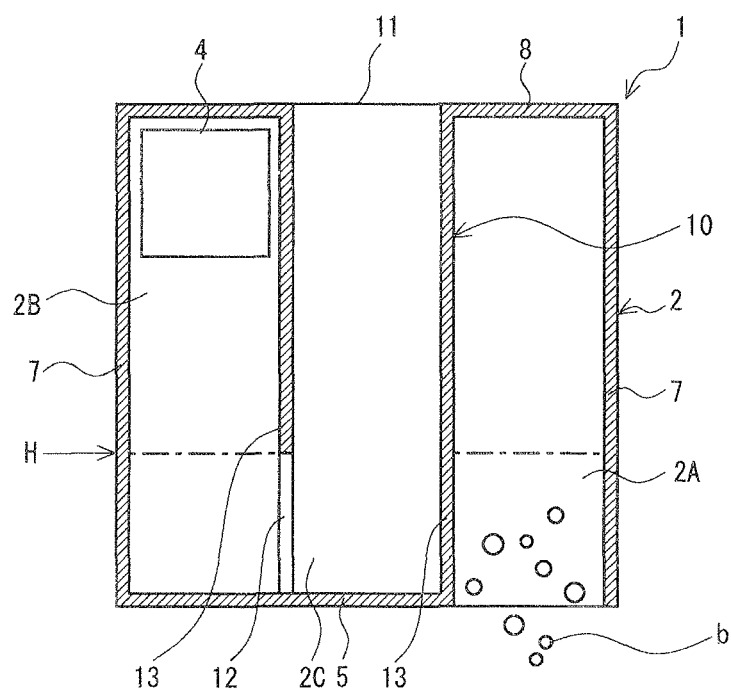
FIG. 10 is a schematic cross-sectional view for describing an operation of the intermittent-bubbling equipment illustrated in FIG. 1.
Figure 11:
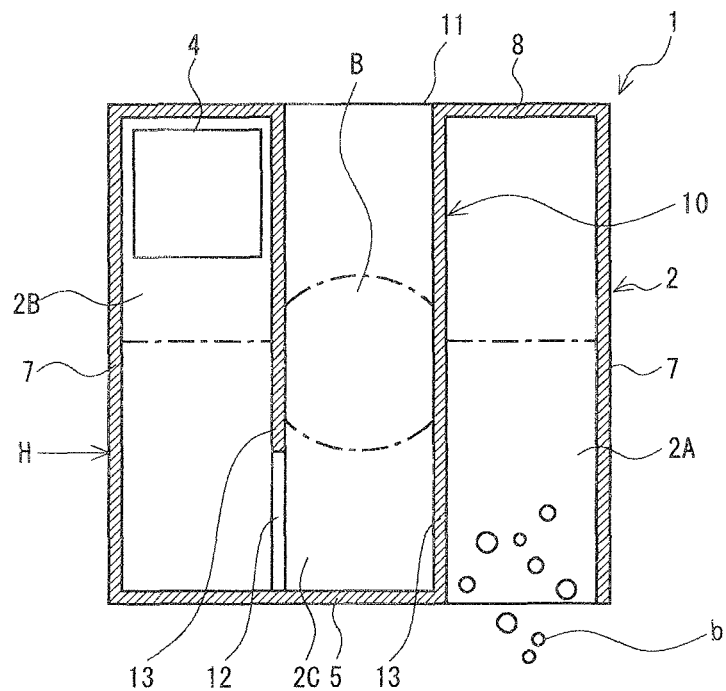
FIG. 11 is a schematic cross-sectional view for describing an operation of the intermittent-bubbling equipment illustrated in FIG. 1.

As the partition walls described above, the intermittent-bubbling equipment 1 includes two parallel division walls 3 that define the gas introducing chamber 2A and the gas inducing chamber 2B (see FIG. 4). Thus, when the intermittent-bubbling equipment 1 introduces gas (bubbles b) from the lower side of the gas introducing chamber 2A, the introduced gas is stored in the gas introducing chamber 2A of the casing 2 and in the gas inducing chamber 2B communicating with the gas introducing chamber 2A at the top of the casing 2 (see FIG. 9). Then, when gas is further introduced and the liquid level in the gas inducing chamber 2B reaches a connecting hole (which may hereinafter be referred to as "first connecting hole 12") between the gas inducing chamber 2B and the gas discharging chamber 2C as illustrated in FIG. 10, the gas in the casing 2 passes through the first connecting hole 12 and is discharged from the discharge pipe 10 as a relatively large bubble B (see FIG. 10).

The height (vertical length) of the intermittent-bubbling equipment 1, the horizontal width of the intermittent-bubbling equipment 1, and the size of the intermittent-bubbling equipment 1 in plan view are not particularly limited.

<Discharge Pipe>

The discharge pipe 10, which is formed by the four internal walls 13 and the bottom plate 5 as described above, is in the shape of a bottomed tube having the gas discharging chamber 2C therein, and has a discharge port 11 on the upper side thereof (see FIGS. 6 and 7). The bottom plate 5 of the discharge pipe 10 is formed by the same member as the bottom plate 5 that closes the lower side of the gas inducing chamber 2B as described below.

The internal walls 13 forming the discharge pipe 10 are formed by flat members and disposed in the center of the casing 2 in plan view. The material of the flat members is not particularly limited, and the design of the flat members may be appropriately changed depending on the environment where the intermittent-bubbling equipment 1 is used. For example, the flat members may be synthetic resin plates. The average thickness of the internal walls 13 is not particularly limited.

Opposite ones of the internal walls 13 are disposed substantially parallel to each other, whereas adjacent ones of the internal walls 13 are substantially orthogonal to each other. Hence the discharge pipe 10 is rectangular in plan view. Accordingly, as described below, the internal walls 13 are disposed substantially parallel to the opposite external walls 7. Note that the term "substantially orthogonal" refers not only to being exactly orthogonal, but also to having an angle from 80° to 100° (preferably from 85° to 95°) between the walls. The same applies to the other parts of the present description.

The four internal walls 13 are of substantially equal length in plan view, and hence the discharge pipe 10 has a square shape in plan view. The length of the internal walls 13 and the inside diameter of the discharge pipe 10 are not particularly limited.

One of the four internal walls 13 has the first connecting hole 12. For convenience, the internal wall 13 having the first connecting hole 12 may hereinafter be referred to as "front internal wall", the internal walls 13 adjacent to the front wall may be referred to as "side internal walls", and the internal wall 13 opposite the back side of the front wall may be referred to as "back internal wall". Although the first connecting hole 12 bored in the flat member forming the front internal wall 13 is illustrated, it is possible that the flat member used to form the front internal wall 13 having the first connecting hole 12 be shorter than the other internal walls 13, and that the first connecting hole 12 be formed on the basis of the height difference.

Although the shape of the first connecting hole 12 is not particularly limited, it is preferable that the first connecting hole 12 have a horizontal upper edge. With a substantially horizontal upper edge of the first connecting hole 12, a large amount of gas can be easily guided at once from the gas inducing chamber 2B to the gas discharging chamber 2C, and this facilitates generation of a large bubble B. The first connecting hole 12 may be rectangular in shape.

For forming a large bubble B, the horizontal width (horizontal length) of the upper edge of the first connecting hole 12 is preferably large. It is thus preferable that the horizontal width of the upper edge of the first connecting hole 12 be substantially equal to the horizontal width of the gas discharging chamber 2C.

The size of the first connecting hole 12 is not particularly limited. The location of the first connecting hole 12 is not particularly limited as long as it is at the bottom of the casing 2.

<Casing>

The external walls 7 of the casing 2 are formed by flat members. The material for the flat members is not particularly limited. As described above, the flat members may be synthetic resin plates. The average thickness of the flat members is not described here, as it is the same as the average thickness of the internal walls 13 (flat members).

The external walls 7 of the casing 2 are disposed substantially parallel to the opposite internal walls 13 of the discharge pipe 10. The external walls 7 of the casing 2 have substantially the same height (vertical length) as the internal walls 13 of the discharge pipe 10, and the upper and lower ends of the external walls 7 of the casing 2 have substantially the same vertical positions as the upper and lower ends of the internal walls 13 of the discharge pipe 10. Note that the term "substantially the same" in length refers not only to being exactly the same in length, but also to having an error within a range that does not impair the function and operation. The same applies to the other parts of the present description.

The length of the external walls 7 of the casing 2 is greater, in plan view, than the length of the opposite internal walls 13 of the discharge pipe 10. In the casing 2, the gas introducing chamber 2A and the gas inducing chamber 2B are arranged around the discharge pipe 10 (in plan view). The description of the length of the external walls 7 of the casing 2 is omitted here, as it is the same as the description of the depth and horizontal width of the intermittent-bubbling equipment 1.

The casing 2 is disposed coaxially with the discharge pipe 10. That is, the casing 2 is disposed such that its center coincides with that of the discharge pipe 10 in plan view. For convenience, the external wall 7 of the casing 2 opposite the front internal wall 13 of the discharge pipe 10 may hereinafter be referred to as "front external wall".

The casing 2 has the bottom plate 5 as described above, and the bottom plate 5 is formed by a flat member. The material for the flat member is not particularly limited. As described above, the flat member may be a synthetic resin plate. The average thickness of the flat member is not described here, as it is the same as the average thickness of the internal walls 13 (flat members).

The bottom plate 5 is secured to the lower edges of the two division walls 3, the lower edge of the front external wall 7 of the casing 2, and the lower edge of the front internal wall 13 of the discharge pipe 10. Thus, the bottom plate 5 airtightly closes the lower side of the gas inducing chamber 2B. As illustrated in FIG. 6, the bottom plate 5 extends to the back internal wall 13 of the discharge pipe 10, and is secured to the lower edges of the side internal walls 13 and the lower edge of the back internal wall 13 of the bottom plate 5. Thus, the bottom plate 5 forms a bottom of the discharge pipe 10 and airtightly closes the lower side of the discharge pipe 10. That is, the bottom plate 5, which is a single flat member, forms both a bottom plate that closes the gas inducing chamber 2B and a bottom plate that closes the gas discharging chamber 2C.

The casing 2 has the lid plate 8 forming a lid, and the lid plate 8 is formed by a flat member. The material for the flat member is not particularly limited. As described above, the flat member may be a synthetic resin plate. The average thickness of the flat member is not described here, as it is the same as the average thickness of the internal walls 13 (flat members).

The lid plate 8 has a hole in its center in plan view. The hole is shaped to correspond to the discharge port 11 (gas discharging chamber 2C). A portion around the hole is secured to the upper edges of the internal walls 13 of the discharge pipe 10. The lid plate 8 is substantially square in outer shape. The lid plate 8 is secured at its outer edge to the upper edge of the casing 2. Thus, the lid plate 8 airtightly closes the upper side of the gas introducing chamber 2A and the upper side of the gas inducing chamber 2B. That is, the lid plate 8, which is a single flat member, forms both a lid plate that closes the upper side of the gas introducing chamber 2A and a lid plate that closes the upper side of the gas inducing chamber 2B.

<Division Wall>

The division walls 3 divide the space between the casing 2 and the discharge pipe 10 into the gas introducing chamber 2A and the gas inducing chamber 2B as described above. In the present embodiment, the two division walls 3 are disposed substantially parallel to each other. The division walls 3 are formed by flat members. The material for the flat members is not particularly limited. As described above, the flat members may be synthetic resin plates. The average thickness of the flat members is not described here, as it is the same as the average thickness of the internal walls 13 (flat members).

The division walls 3 extend continuously from a pair of side walls 13 of the discharge pipe 10 (i.e., two internal walls 13 adjacent to the internal wall 13 having the first connecting hole 12) to the front external wall 7. That is, the division walls 3 extend continuously from respective two opposite ones of the four internal walls 13 to the external wall 7, and the internal wall 13 interposed between the two internal walls 13 has the first connecting hole 12. In the intermittent-bubbling equipment 1, as described above, the discharge pipe 10 (gas discharging chamber 2C) is disposed in the center in plan view, the gas inducing chamber 2B is disposed adjacent to the discharge pipe 10 (gas discharging chamber 2C) in plan view, and the gas introducing chamber 2A is disposed around the discharge pipe 10 in a U shape in plan view. It is preferable that one side internal wall 13 of the pair of side internal walls 13 and the division wall 3 extending from the one side internal wall 13 be formed by a single flat member, and that the other side internal wall 13 and the division wall 3 extending from the other side internal wall 13 be formed by a single flat member. This can reduce the number of components of the intermittent-bubbling equipment 1. Also, since each side internal wall 13 and the corresponding division wall 3 are formed by the same member, the securing strength between the discharge pipe 10 and the casing 2 is improved, and hence the mechanical strength of the intermittent-bubbling equipment 1 is improved.

A cross-sectional area of the gas introducing chamber 2A is preferably greater than a cross-sectional area of the gas discharging chamber 2C. Specifically, in the present embodiment, the cross-sectional area of the gas introducing chamber 2A is seven times the cross-sectional area of the gas discharging chamber 2C. This allows gas in the casing 2 to be effectively discharged at once. This is probably because of a difference in liquid pressure at a gas interface between the gas introducing chamber 2A and the gas discharging chamber 2C. Note that the cross-sectional area of each of the gas introducing chamber 2A and the gas discharging chamber 2C refers to a cross-sectional area at a horizontal level (indicated by H in FIGS. 2 and 6) of the upper end (or upper edge) of the first connecting hole 12, and this applies to the cross-sectional area of the gas inducing chamber 2B described below. Also, the term "upper end" refers to an uppermost point of the first connecting hole 12, and corresponds to the upper edge horizontally disposed in the present embodiment.

The ratio of the cross-sectional area of the gas introducing chamber 2A to the cross-sectional area of the gas discharging chamber 2C is not particularly limited.

The cross-sectional area of the gas inducing chamber 2B is preferably smaller than the cross-sectional area of the gas introducing chamber 2A. Specifically, in the present embodiment, the cross-sectional area of the gas introducing chamber 2A is seven times the cross-sectional area of the gas inducing chamber 2B. This allows gas in the casing 2 to be effectively discharged at once. The ratio of the cross-sectional area of the gas introducing chamber 2A to that of the gas inducing chamber 2B is not particularly limited.

One of the division walls 3 has a connecting hole (which may hereinafter be referred to as "second connecting hole 4") between the gas introducing chamber 2A and the gas inducing chamber 2B. The second connecting hole 4 can be formed in both of the two division walls 3, but is formed in only one of the division walls 3 in the present embodiment. The height of the division walls 3 is substantially the same as the height of the external walls 7 of the casing 2 and the internal walls 13 of the discharge pipe 10.

The location of the second connecting hole 4 is not particularly limited, as long as the lower end of the second connecting hole 4 is above the upper end of the first connecting hole 12.

The shape of the second connecting hole 4 is not particularly limited and may be, for example, rectangular. Although the second connecting hole 4 bored in the flat member forming one of the division walls 3 is illustrated, it is possible that the flat member used to form the division wall 3 having the second connecting hole 4 be shorter than the internal walls 13, and that the second connecting hole 4 be formed on the basis of the height difference.

The size of the second connecting hole 4 is not particularly limited.

The ratio of the internal area of the second connecting hole 4 (or the total internal area of more than one second connecting hole 4) to the internal area of the first connecting hole 12 is not particularly limited.

<Operation of Intermittent-Bubbling Equipment>

An operation of the intermittent-bubbling equipment 1 will now be described. Note that the bubble generating mechanism described below is merely an exemplary and schematic representation. The bubble generating mechanism is changed slightly depending on the shapes and positional relationship of various components, and hence the following description does not necessarily accurately reflect an actual bubble generating mechanism.

The intermittent-bubbling equipment 1 is used to intermittently generate relatively large bubbles B while being immersed in the liquid L. As illustrated in FIG. 9, bubbles b are sequentially supplied from below the gas introducing chamber 2A and stored in the upper part of the gas introducing chamber 2A and further in the upper part of the gas inducing chamber 2B, so that the liquid levels in both the gas introducing chamber 2A and the gas inducing chamber 2B are lowered.

When more bubbles b are supplied to the intermittent-bubbling equipment 1, the liquid level in the gas inducing chamber 2B reaches the upper edge of the first connecting hole 12 as illustrated in FIG. 10. Then, when more bubbles b are supplied, gas in the gas inducing chamber 2B is moved through the first connecting hole 12 to the gas discharging chamber 2C. Since this movement of the gas causes an imbalance in pressure in the gas inducing chamber 2B, gas in the gas introducing chamber 2A flows through the second connecting hole 4 into the gas inducing chamber 2B. This flow of gas into the gas inducing chamber 2B causes movement of gas through the first connecting hole 12 into the gas discharging chamber 2C, so that a relatively large bubble B is eventually discharged from the discharge port 11 (see FIG. 11). The reason for which the relatively large bubble B is discharged as described above is not necessarily clear. A possible reason is that when gas in the gas inducing chamber 2B is moved through the first connecting hole 12 to the gas discharging chamber 2C, an attractive force acts on the following gas. Another possible reason is that when gas stored in the gas inducing chamber 2B is discharged from the first connecting hole 12, the shrinking effect of surface tension occurs, or an upward liquid pressure acts on the liquid surface in the gas introducing chamber 2A.

After the relatively large bubble B is discharged, the liquid levels in the gas introducing chamber 2A and the gas inducing chamber 2B are raised and bubbles b are sequentially stored as described above. Thus, a relatively large bubble B is discharged again, and intermittent discharge of relatively large bubbles B takes place.

<How Intermittent-Bubbling Equipment is Used>

As illustrated in FIG. 8, the intermittent-bubbling equipment 1 is disposed below the filtration module M immersed in the liquid L. The intermittent-bubbling equipment 1 is used for cleaning the filtration module M by supplying bubbles B to the filtration module M. The filtration module M includes a pair of securing members 50 and 51 configured to secure the plurality of filtration membranes 52.

When the intermittent-bubbling equipment 1 supplies a bubble B to the filtration module M, the bubble B is divided by the securing member 50 into a plurality of divided bubbles C, which move upward while being in contact with the surfaces of the plurality of filtration membranes 52. The divided bubbles C have an average diameter close to the distance between the plurality of filtration membranes 52, and are easily distributed evenly among the filtration membranes 52. Accordingly, the surfaces of the filtration membranes 52 can be thoroughly cleaned with the divided bubbles C. Since the divided bubbles C move up faster than conventional microbubbles, the surfaces of the filtration membranes 52 can be effectively cleaned with high scrubbing pressure. When the filtration membranes 52 are vertically disposed as in the filtration module M illustrated, the divided bubbles C move upward along the longitudinal direction of the filtration membranes 52. This allows more efficient and effective cleaning of the surfaces of the filtration membranes 52.

<Advantages>

The intermittent-bubbling equipment 1 introduces gas (bubbles b) from the open lower side of the gas introducing chamber 2A. When the liquid levels in the gas introducing chamber 2A and the gas inducing chamber 2B reach the first connecting hole 12, the gas in the casing 2 is discharged as a relatively large bubble B from the discharge pipe 10. The intermittent-bubbling equipment 1 can thus be suitably used for cleaning the filtration module M.

The intermittent-bubbling equipment 1 can be produced by assembling flat members, and the cost of manufacture can be reduced. Also, since the lower side of the gas inducing chamber 2B and the lower side of the gas discharging chamber 2C are closed by a single flat member (bottom plate 5), the number of components can be reduced. Additionally, since the bottom plate 5 is secured to both the internal walls 13 and the external walls 7, the securing strength between the discharge pipe 10 and the casing 2 is improved, and hence the mechanical strength of the intermittent-bubbling equipment 1 is improved. Also, since the bottom plate 5 is secured to the external walls 7 of the casing 2 at the lower ends of the external walls 7, the intermittent-bubbling equipment 1 with improved securing strength can be easily and reliably produced.

Also, since the upper side of the gas introducing chamber 2A and the upper side of the gas inducing chamber 2B are closed by a single flat member (lid plate 8), the number of components can be reduced. Additionally, since the lid plate 8 is secured to both the internal walls 13 and the external walls 7, the securing strength between the discharge pipe 10 and the casing 2 is improved, and hence the mechanical strength of the intermittent-bubbling equipment 1 is improved. In particular, in the present embodiment, since the discharge pipe 10 and the casing 2 are secured on the upper and lower sides by the lid plate 8 and the bottom plate 5, respectively, a higher mechanical strength of the intermittent-bubbling equipment 1 can be achieved.

Other Embodiments

The embodiments disclosed herein are to be considered illustrative and not restrictive in all aspects. The scope of the present invention is not limited to the configurations of the embodiments described above. The scope of the present invention is defined by the appended claims, and is intended to encompass meanings equivalent to the claims and all changes within the scope.

Figure 12A:
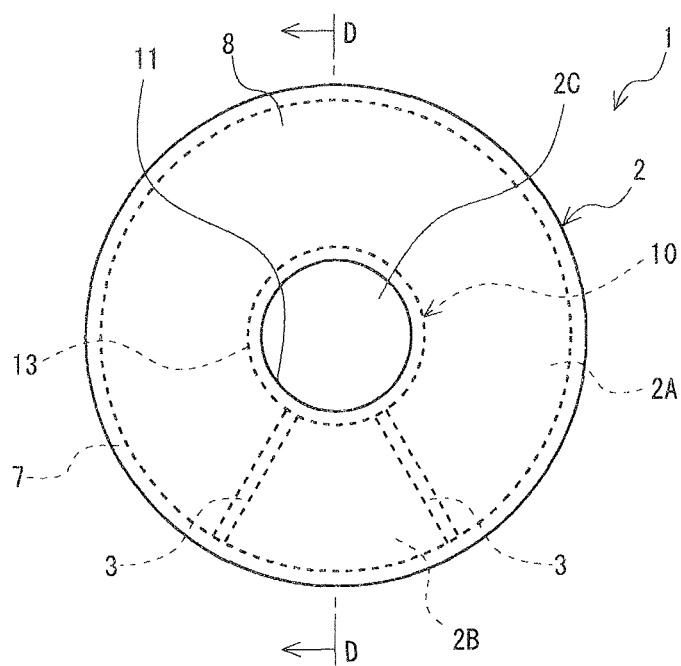
FIG. 12A is a schematic plan view of intermittent-bubbling equipment according to an embodiment of the present invention, different from that in FIG. 1.
Figure 12B:
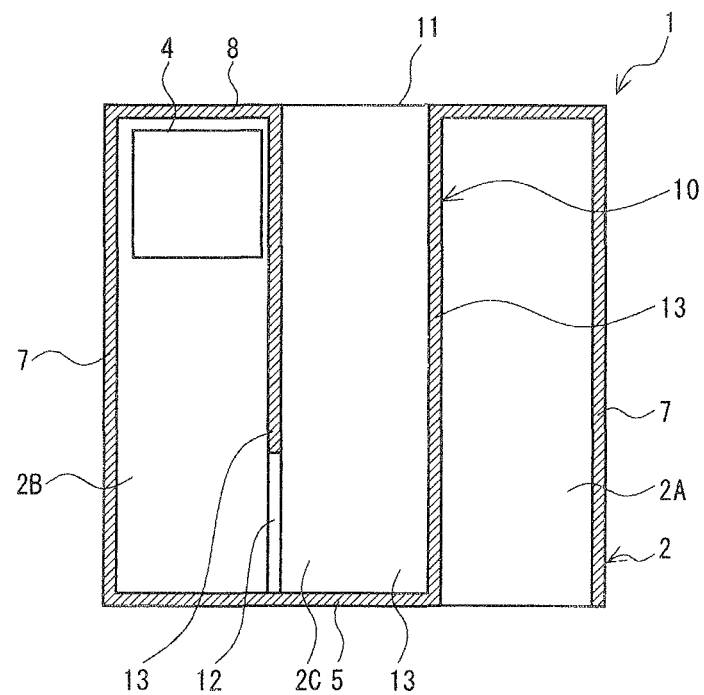
FIG. 12B is a cross-sectional view taken along line D-D of FIG. 12A.

The intermittent-bubbling equipment 1 does not necessarily need to be rectangular in plan view as described in the embodiments, but may be, for example, cylindrical (circular in plan view) as illustrated in FIG. 12A. Also, only the discharge pipe 10 may be circular in plan view. In FIGS. 12A, 12B, 13A, 13B, 14A, 14B, 15A, and 15B, components having the same configurations or functions as those in the first embodiment are denoted by the same reference numerals, and their detailed description will be omitted.

Figure 13A:
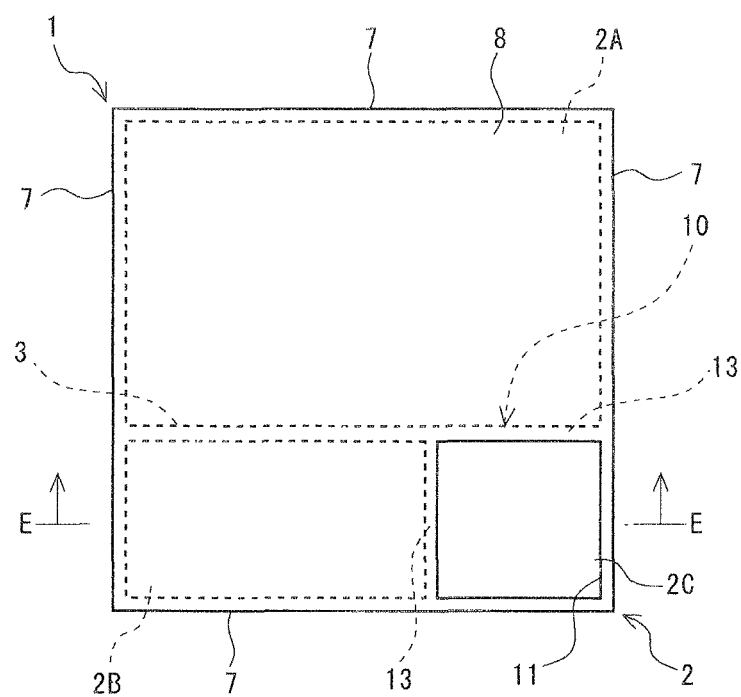
FIG. 13A is a schematic plan view of intermittent-bubbling equipment according to an embodiment of the present invention, different from those in FIGS. 1, 12A, and 12B.
Figure 13B:
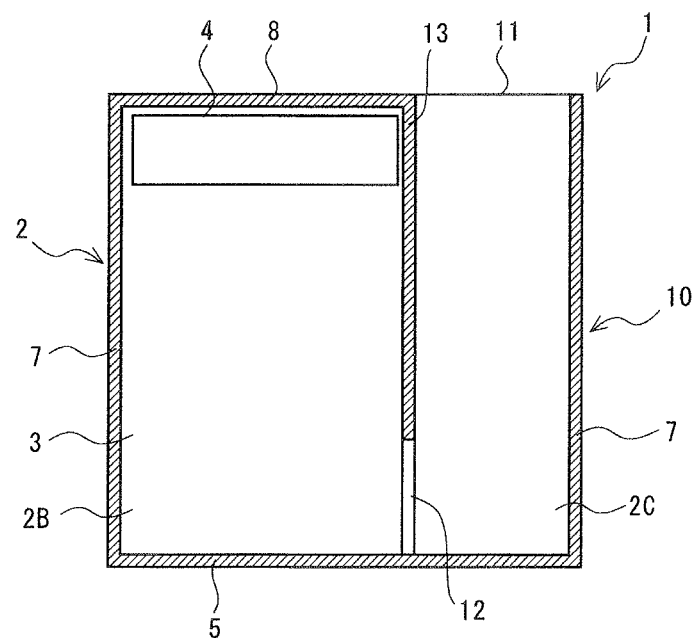
FIG. 13B is a cross-sectional view taken along line E-E of FIG. 13A.
Figure 14A:
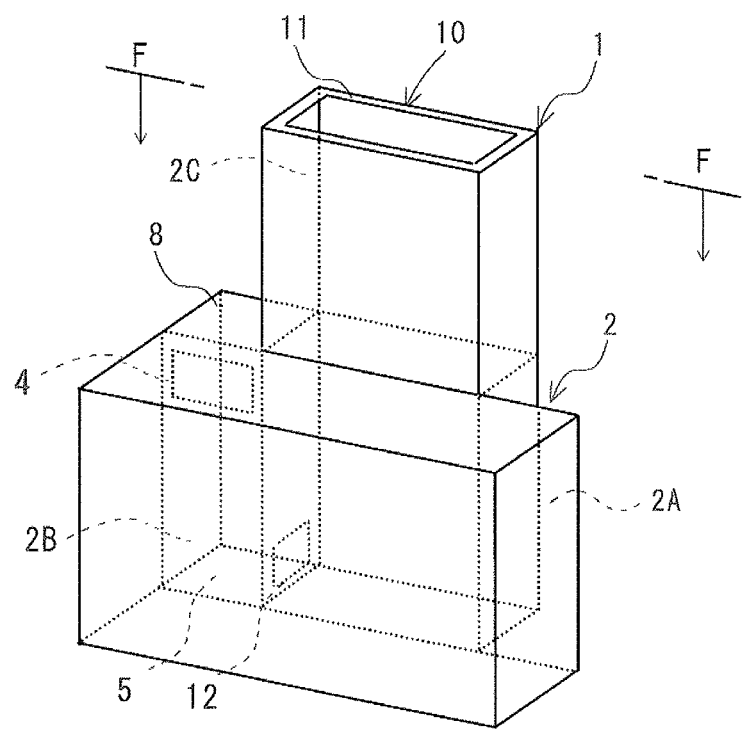
FIG. 14A is a schematic plan view of intermittent-bubbling equipment according to an embodiment of the present invention, different from those in FIGS. 1, 12A, 12B, 13A, and 13B.
Figure 14B:
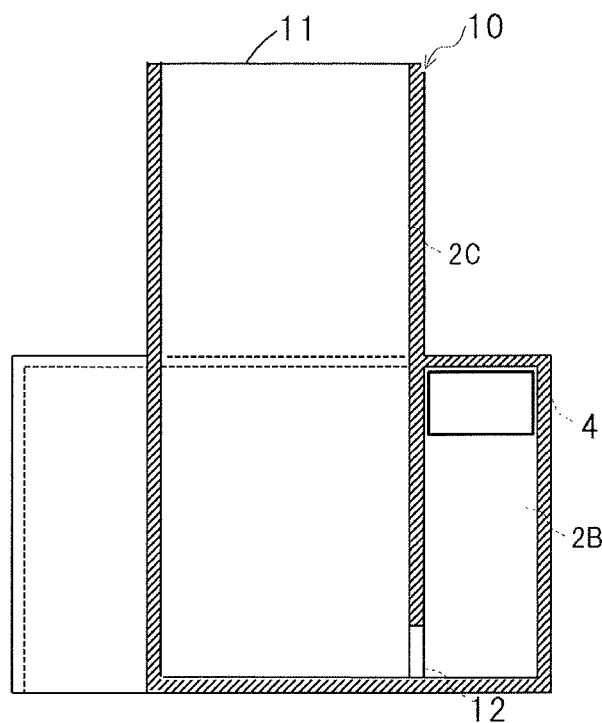
FIG. 14B is a cross-sectional view taken along line F-F of FIG. 14A, as viewed from a back side.
Figure 15A:
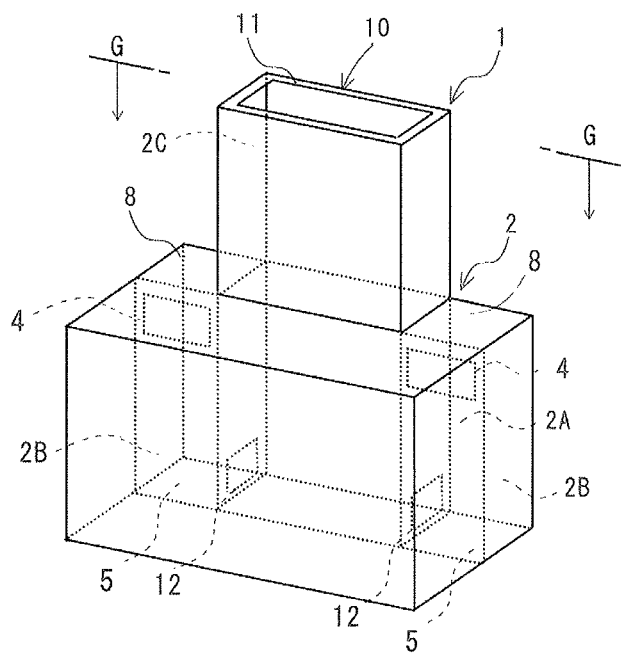
FIG. 15A is a schematic plan view of intermittent-bubbling equipment according to an embodiment of the present invention, different from those in FIGS. 1, 12A, 12B, 13A, 13B, 14A, and 14B.
Figure 15B:
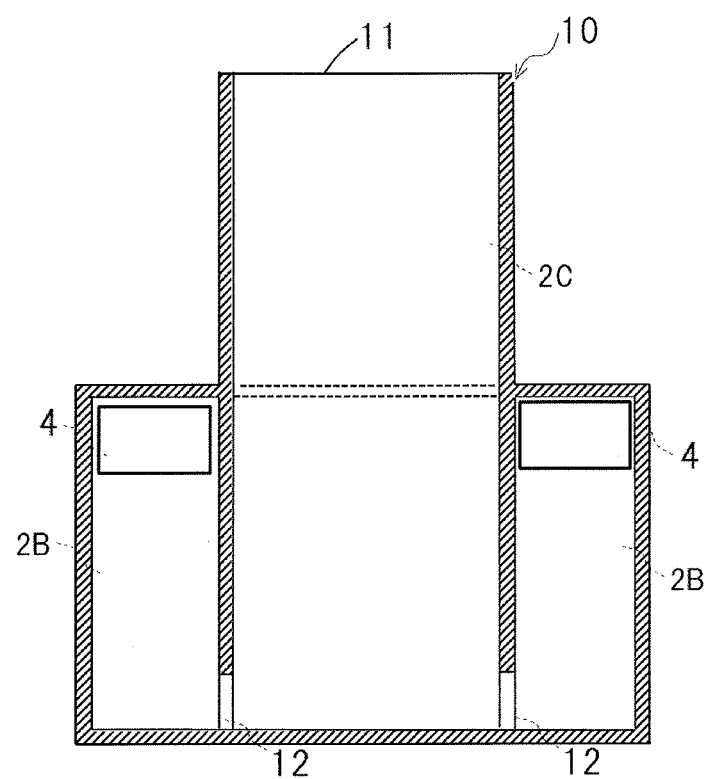
FIG. 15B is a cross-sectional view taken along line G-G of FIG. 15A, as viewed from a back side.

Although the discharge pipe 10 centrally located in plan view is described in the embodiments, the discharge pipe 10 may be located, for example, at an end in plan view as illustrated in FIG. 13A. Alternatively, for example, as illustrated in FIG. 14A, the discharge pipe 10 may be located at an end in plan view and elongated to raise the discharge port 11 or, as illustrated in FIG. 15A, the gas inducing chambers 2B may be disposed on both sides of the gas discharging chamber 2C. However, it is preferable that the discharge pipe 10 be centrally located in plan view, as in the embodiments described above. This allows the gas introducing chamber 2A, which is open at its bottom, to be easily positioned around the discharge pipe 10. Thus, even though the intermittent-bubbling equipment 1 is small in size, bubbles b can be accurately supplied thereto. With this configuration, a device that supplies bubbles b can be disposed below the discharge pipe 10. Therefore, it is highly likely that bubbles b that have escaped to the outside of the intermittent-bubbling equipment 1 can come into contact with the filtration module M to be cleaned.

INDUSTRIAL APPLICABILITY

The intermittent-bubbling equipment according to the present invention is capable of generating large-diameter (large-volume) bubbles and can be suitably used for cleaning, for example, a membrane module.

The invention claimed is:

1. Intermittent-bubbling equipment used while being immersed in a liquid, comprising:
   a tubular casing vertically disposed; and a plurality of partition walls disposed substantially parallel to an axial direction in the casing, the partition walls being configured to define a gas introducing chamber, a gas inducing chamber, and a gas discharging chamber,
   wherein the gas introducing chamber and the gas inducing chamber communicate with each other at a top of the casing, and the gas inducing chamber and the gas discharging chamber communicate with each other at a bottom of the casing; and
   an upper side of the gas introducing chamber and an upper side of the gas inducing chamber are closed by a lid plate, and a lower side of the gas inducing chamber and a lower side of the gas discharging chamber are closed by a bottom plate,
   wherein the casing has four external walls arranged in the shape of a rectangular tube;
   the plurality of partition walls include four internal walls configured to define the gas discharging chamber in the shape of a rectangular column, and two parallel division walls configured to define the gas introducing chamber and the gas inducing chamber;
   the internal walls are disposed substantially parallel to the opposite external walls;
   the division walls extend continuously from respective two opposite ones of the four internal walls to one of the external walls; and
   the internal wall interposed between the two internal walls has a connecting hole between the gas inducing chamber and the gas discharging chamber.

2. The intermittent-bubbling equipment according to claim 1, wherein a cross-sectional area of the gas introducing chamber is greater than a cross-sectional area of the gas discharging chamber.

3. The intermittent-bubbling equipment according to claim 1, wherein an upper edge of a connecting hole between the gas inducing chamber and the gas discharging chamber is formed to be substantially horizontal.

4. The intermittent-bubbling equipment according to claim 1, wherein a bottom plate that closes the gas inducing chamber and a bottom plate that closes the gas discharging chamber are formed by a single flat member.

5. The intermittent-bubbling equipment according to claim 1, wherein the gas discharging chamber is disposed in a center of the casing in plan view.

6. The intermittent-bubbling equipment according to claim 1, wherein the intermittent-bubbling equipment is used for cleaning a filtration module having a plurality of filtration membranes.

* * * * *